United States Patent
Tuli

(10) Patent No.: US 6,348,914 B1
(45) Date of Patent: Feb. 19, 2002

(54) WRITING DEVICE FOR STORING HANDWRITING

(76) Inventor: Raja S. Tuli, 1155 Rene Levesque West, #3500, Montreal, QC (CA), H3B 3T6

( * ) Notice: Subject to any disclaimer, the term of this patent is extended or adjusted under 35 U.S.C. 154(b) by 0 days.

(21) Appl. No.: 09/412,438

(22) Filed: Oct. 5, 1999

(51) Int. Cl.[7] ................................................. G09G 5/04

(52) U.S. Cl. ...................... 345/179; 345/158; 345/177; 382/188

(58) Field of Search ................................ 345/179, 156, 345/157, 180, 173, 174, 175, 177; 341/22; 178/18.01–18.11, 19.01–19.09; 382/1.88, 314

(56) References Cited

U.S. PATENT DOCUMENTS

| 5,215,397 A | * | 6/1993 | Tguchi et al. ................. 382/2 |
| 5,750,939 A | * | 5/1998 | Makinwa et al. ............ 345/179 |
| 5,774,602 A | * | 6/1998 | Taguchi et al. .............. 382/314 |
| 5,920,306 A | * | 7/1999 | Kikinis ........................ 345/179 |
| 5,977,958 A | * | 11/1999 | Baron et al. ................. 345/179 |

* cited by examiner

Primary Examiner—Dennis-Doon Chow

(57) ABSTRACT

A writing device for storing handwriting is disclosed. The writing device comprises a pen and a cap that are equipped with RF or acoustic transmitters and a RF or acoustic receiver in order that triangulation may be used to track the positions of the pen as it is being implemented by the user. The pen is also equipped with a pressure sensor for detecting when the pen is in contact or non-contact with a writing medium. The pen also comprises a microprocessor for compiling the images of the handwritten characters, and an internal memory for sequentially storing the data.

2 Claims, 2 Drawing Sheets

WRITING DEVICE FOR STORING HANDWRITING

PRIOR ART

Various writing devices for storing handwriting have been suggested in the past, using stress sensors and CCD sensors (refer to U.S. Pat. Nos. 5,774,602 and 5,215,397). However, the present invention differs from these inventions, in that triangulation is used to calculate and identify the position of the writing device, by means of data provided from RF or acoustic transmitters and receivers.

SUMMARY OF THE INVENTION

The heart of the present invention relates to a writing device, such as a pen, for recording handwriting on writing medium, and storing the handwriting into an internal memory. The handwriting may be subsequently exported to a computer. The writing device is readily portable and lightweight, and is eminently useful for a user, one advantage being that it eliminates the time spent transcribing notes into a computer.

The writing device comprises a cap that includes a plurality of RF or acoustic transmitters and a pen that contains numerous RF or acoustic sensors. The RF or acoustic transmitters emit signals that are received by the RF or acoustic sensors, which signals are subsequently sent to a microprocessor. The microprocessor monitors the location of the pen, as the user is writing, by performing triangulation techniques. A constant reference of the cap to the pen is essential for the triangulation and identification of the exact positions of the pen as a user is writing.

The pen also comprises a storing means for sequentially storing the handwritten data which data is obtained by the user applying pressure with the pen on the writing medium.

Both the cap and the pen are equipped with batteries that provide internal power supplies to the same.

DETAILED DESCRIPTION OF THE PREFERRED EMBODIMENT

Figure 1:
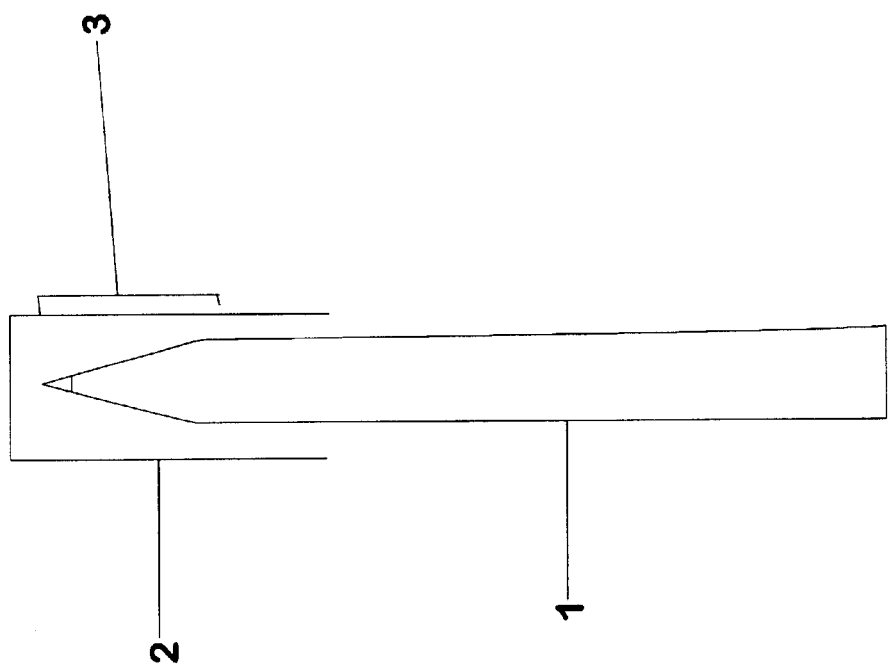
FIG. 1 illustrates the writing device and the cap.

In a preferred embodiment of the present invention, FIG. 1 illustrates a writing device for storing the handwriting generated by a user. The writing device is comprised of a pen 1 and a cap 2, which are necessary for an accurate operation of the device. The writing device is essentially shaped like a standard pen, yet the housing contains a plurality of mechanisms for storing the handwriting of the user. The cap also contains mechanisms that function in collaboration with the mechanisms in the pen. A clip 3 connected to the cap, and lying parallel to the length of the cap, is also provided. The clip allows the pen to be attached to other items, such as a pocket, or a writing medium, such as paper.

Figure 2:
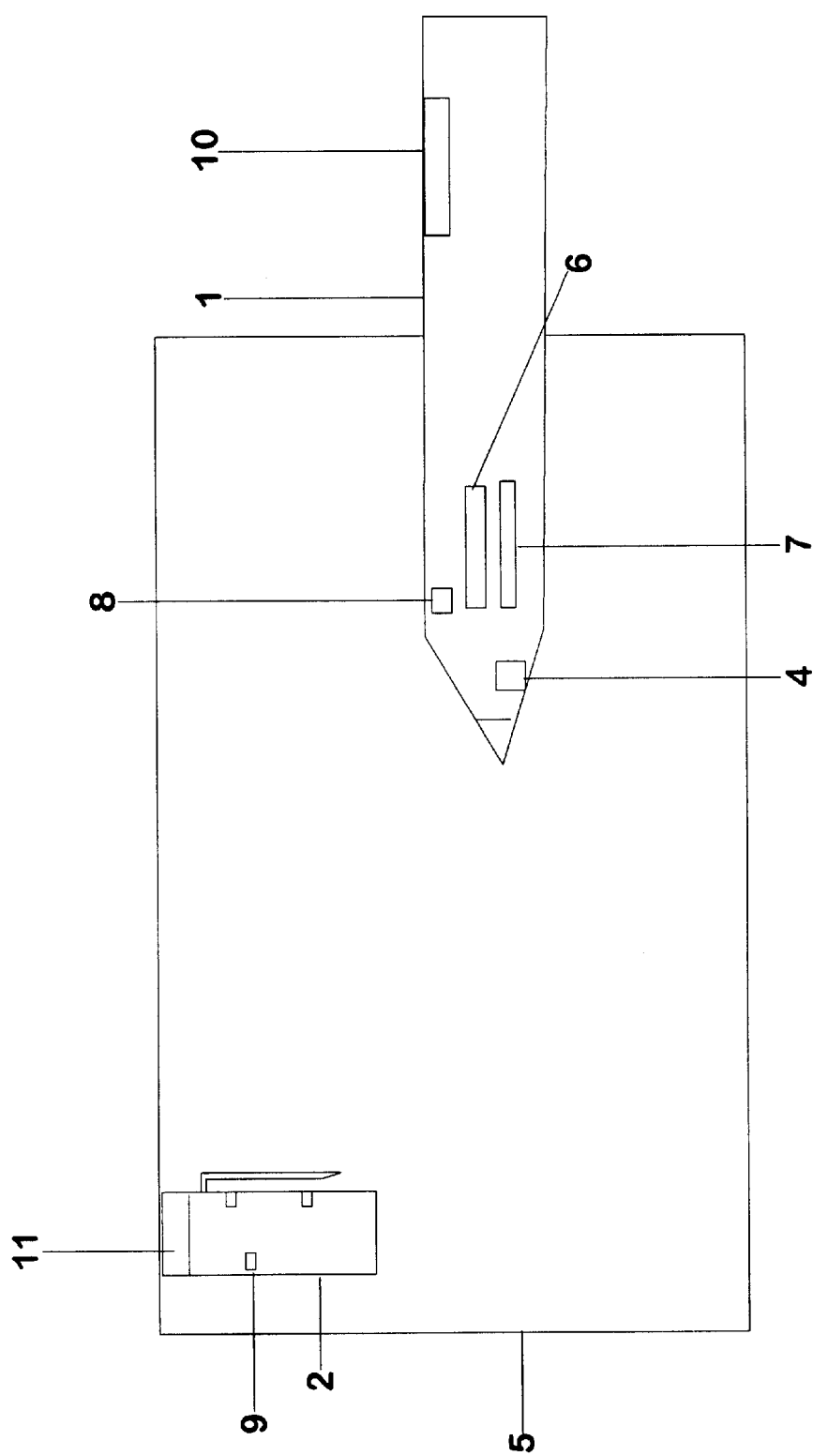
FIG. 2 illustrates cross-sectional views of the writing device and cap.

Referring to FIG. 2, a cross-sectional view of the cylindrical housing of the pen 1, showing an inner mechanism and a cross-sectional view of the cap are provided. A plurality of RF or acoustic transmitters 9, located within the cap, may transmit signals. The emitted signals are received by a RF or acoustic sensor 8, or a plurality of RF or acoustic sensors, located within the pen. The signals received by the RF or acoustic sensor are sent to a microprocessor 6 to be processed. Subsequently, the microprocessor may utilize the received signals to accurately monitor the location of the pen, as the user is writing, by means of conventional triangulation techniques.

During the implementation of the pen by the user, a pressure sensor 4 detects the contact or non-contact of the pen against the writing medium 5. Therefore, the sensor detects a condition that handwriting is occurring only when the user presses the pen against the writing medium. The pressure data detected by the pressure sensor is sent to a microprocessor 6 for processing.

In particular, once the user begins implementing the pen by pressing it onto the writing medium, the pressure sensor detects that handwriting is occurring. Concurrent to the microprocessor receiving the data that handwriting is occurring, the microprocessor commences triangulating the various positions of the pen based upon the signals received from the RF or acoustic sensor. Thus, the microprocessor simultaneously processes the data received from the pressure sensor with the triangulation calculations to assemble the shapes of the handwritten characters. The shapes of the handwritten characters are sent to an internal memory 7 to be sequentially stored until the information is exported into a computer at a later time.

In order that accurate triangulation values may be calculated, the reference of the cap to the pen must be consistently maintained. The user may attach the cap directly onto the writing medium, by means of the clip, or simply place the cap in the proximity of the writing medium. However, attaching the clip onto the writing medium guarantees a continuous reference between the pen and the cap because the cap is held is a fixed position. Thus, the clip is both practical and functional in that it facilitates mobility, by straddling a pocket, and is able to maintain a constant reference between the cap and the pen.

Both the pen and the cap are equipped with batteries 10 and 11 that are mechanically and electrically coupled to the housing in order to provide internally disposed electrical power sources. In that the pen and cap are hand-held and portable units, batteries are required for the operation of all of the RF or acoustic transmitters and sensors, as well as the microprocessor and memory.

In an alternate embodiment of the present invention, a RF or acoustic sensor is located in the cap, and a plurality of RF or acoustic transmitters are located in the pen. A microprocessor and an internal memory are positioned within the cap.

As the user implements the pen, the RF or acoustic transmitters emit signals that are received by the RF or acoustic sensor. The received signals are sent to the microprocessor, which carries out conventional triangulation techniques to calculate the positions of the pen, as the user is writing. The assembled handwritten characters are then sent to the internal memory to be stored, until the information is exported into a computer.

The invention having been thus described with particular reference to the preferred forms thereof, it will be obvious that various changes and modifications may be made therein without departing from the spirit and scope of the invention as defined in the appended claims.

I claim:

1. A writing device for storing handwriting, comprising:
   a pen and a cap;
   a clip that lies parallel to the cap, comprising an open end and a closed end such that the clip may straddle a pocket;
   a pressure sensor for detecting contact or non-contact of the pen on a writing medium;

a plurality of RF or acoustic transmitters located in the cap;

a RF or acoustic receiver located in the pen;

a microprocessor located in the pen for performing triangulation techniques to monitor the position of the pen;

an internal memory for storing handwritten data.

2. A writing device for storing handwriting, comprising:

a pen and a cap;

a clip that lies parallel to the cap, comprising an open end and a closed end such that the clip may straddle a pocket;

a pressure sensor for detecting contact or non-contact of the pen on a writing medium;

one or more RF or acoustic transmitters located in the pen;

a RF or acoustic receiver located in the cap;

a microprocessor located in the cap for performing triangulation techniques to monitor the position of the pen; and an internal memory for storing handwritten data.

* * * * *